2 Sheets--Sheet 1.

W. LENZ & R. WITTKE.
Grain-Binders.

No. 155,528. Patented Sept. 29, 1874.

WITNESSES:

INVENTOR:

BY

ATTORNEYS.

2 Sheets--Sheet 2.

W. LENZ & R. WITTKE.
Grain-Binders.

No. 155,528. Patented Sept. 29, 1874.

WITNESSES:
Chas. Nida
O. Sedgwick

INVENTOR:
W. Lenz
R. Wittke

BY
ATTORNEYS.

UNITED STATES PATENT OFFICE.

WILLIAM LENZ AND ROBERT WITTKE, OF GLENWOOD, IOWA.

IMPROVEMENT IN GRAIN-BINDERS.

Specification forming part of Letters Patent No. 155,528, dated September 29, 1874; application filed May 23, 1874.

*To all whom it may concern:*

Figure 1:
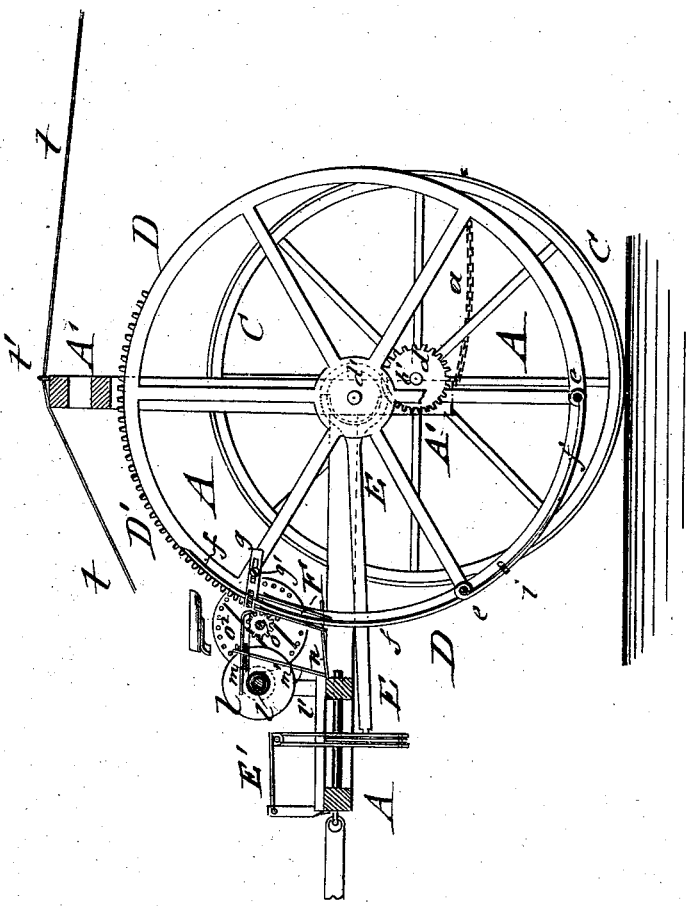
Figure 2:
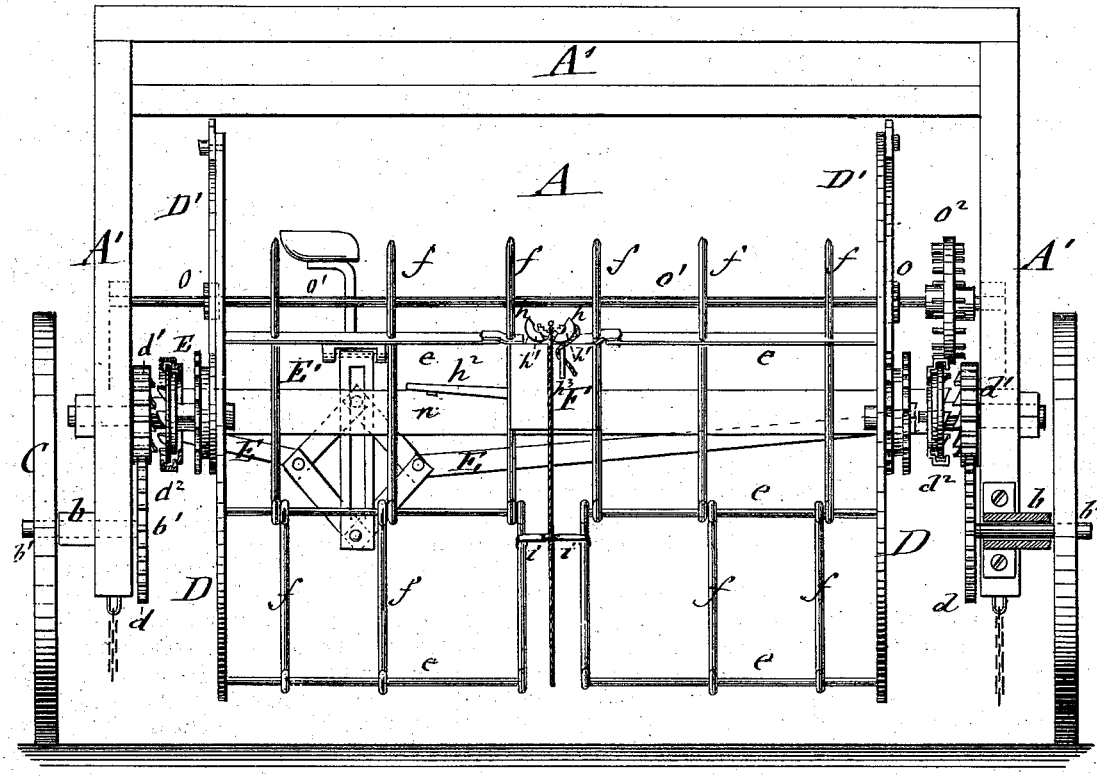
Figures 3, 4, 5:
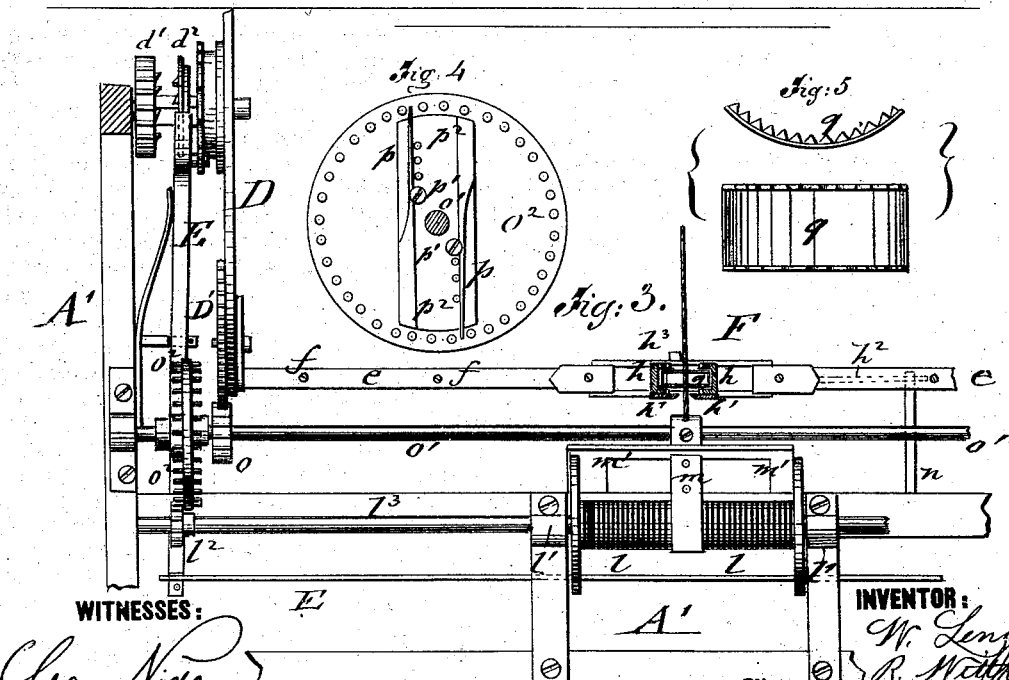

Be it known that we, WILLIAM LENZ and ROBERT WITTKE, of Glenwood, in the county of Mills and State of Iowa, have invented a new and Improved Grain-Binder, of which the following is a specification:

In the accompanying drawings, Figure 1 represents a sectional side elevation of our improved grain-binder; Fig. 2, a rear elevation of the grain-binder; Fig. 3, a top view of the same; Fig. 4, a detail side view of the tension device for stretching the binding-cord, and Fig. 5 detail side and top views of the cord-fastening clasp.

The invention will first be fully described, and then pointed out in the claims.

In the drawing, A represents the grain-binder, which is attached, either by suitable connecting-chains to the reaper to be worked in conjunction therewith, or provided with shafts to be drawn separately by one or two horses. The different working parts of the grain-binder A are supported by a frame, A', of suitable size, which consists of vertical side standards with lateral top connection, and a horizontal front extension. The binder-frame A' is placed, by bearings $b$ at the lower ends of the side standards, on the short axles $b'$ of the supporting-wheels C, which are constructed in the usual approved manner, for setting the whole binder mechanism in motion. Spider-frames D are supported on central gudgeons or shafts at suitable height above the axles of the driving-wheels C, and thrown in and out of gear with the same by a lever mechanism, E, operated by a treadle, E', at the front part of frame A'. Gear-wheels $d$ of the supporting-wheels C intermesh with loose wheels $d^1$ of the spider-frame shafts, and are engaged by suitable clutch-wheels $d^2$ operated by lever mechanism E, as soon as the treadle is depressed by the foot of the attendant, causing thereby the rotation of the spider-frames until discontinued by the release of the treadle and withdrawal of the clutch. Each spider-frame D is provided with strong lateral arms $e$, which are attached under right angles to the frame along one-third part of the circumference thereof, extending nearly half-way toward the arms of the other frame D, and leaving a space between the arms of both frames for the passage of the grain-binding cord. Rods $e$ are again connected by prongs or tines $f$, which are parallel to the spider-frames, and firmly fastened to the arms $e$ under the same diameter as the spider-frames D. Tines $f$ project some distance over the first arms $e$, and are pointed for the purpose of sliding along the ground, and taking up the grain left there by the reaper. The higher or lower position of the gathering ends of the tines $f$ is adjusted by means of a slotted guide-piece, $g$, and set-screw $g'$ applied to the arms of the spider-frames D, Fig. 1. The cord-fastening mechanism F connects the arms $e$ centrally near the ends of the tines $f$, and is constructed of grooved jaws $h$ and cord-cutting shears $h'$ operated by a projecting-lever, $h^2$. A band-spring, $h^3$, at the rear part of lock E, serves to secure the end of the cord used for binding the grain into a sheaf. The cord is guided along the central space between the tine-sections and supported on one or more band-springs, $i$, attached at suitable distances to the innermost tines. The binding-cord is fed to the rotating tine-sections by a spool, $l$, which turns in suitable standards $l'$ of the central part of the horizontal front frame. An adjustable guide-bar, $m$, with bent perforated end, is applied to a frame, $m'$, for the purpose of placing the cord into the required position between the tine-sections. A rearward-projecting band-spring, $n$, of front frame A' comes in contact with the lever $h^2$ of the locking mechanism F after the rotation of the tines is completed, and causes thereby the closing of the spring-jaws and shears. Adjustable toothed segments D' are attached by set-screws along the circumference of spider-frames D, so as to gear with pinions $o$ of lateral front shaft $o^1$, and then, by end gear-wheel $o^2$, with a pinion, $l^2$, of the spool-shaft $l^3$, producing thereby the stretching and winding up of the cord on the spool previous to its clamping and cutting by the lock mechanism. The degree of tension of the binding-cord is regulated by band-springs $p$, Fig. 4, applied, by set-screws $p^1$, to a radial-plate, $p^2$, keyed to intermediate front shaft $o^1$, and placed sidewise of loose gear-wheel $o^2$, in such a manner that the ends of springs $p$ engage the teeth of wheel $o^2$ until the tension of the cord overcomes the action of the springs, and detaches plate $p^2$ from the teeth of wheel $o^2$ without turning spool $l$. A curved clasp-plate, $q$, Fig. 5, with serrated edges, is stamped out of suitable sheet metal, and firmly clamped around the ends of the binding-cord by the grooved spring-jaws of the locking mechanism, so that, after the fastening of the clasp and cutting of the cord, the sheaf is ready to be dropped by the turning over of the tine-sections.

The grain-binder is operated by following the reaper, taking up the grain left at suitable intervals by the same. The attendant is seated on the front frame of the binder, operating with his foot the lever mechanism for throwing the spider-frames in and out of gear. He places the serrated clasp with one hand into the grooved jaws of the lock, places with the other hand the end of the binding-cord from the outside below the lock and up the inside over the clasp, winds it around one jaw and secures then the end to the band-spring at the rear of the lock. The turning motion of the tines unwinds a sufficient length of the cord from the spool to extend from the guide-rod along the circumference of the same, till the turning of the tines is nearly completed. The cord has then loosely encircled the gathered grain on the tines. The toothed segments of the spider-frames gear at this point with the spool-shaft, and produce the rewinding of the cord on the spool, and the stretching of the same, to such a degree that the supporting tine-springs give way and allow the formation of the loop around the grain. The cord is then tightened until the strain throws the spool-shaft out of gear by means of the tension-springs. The lever of the lock mechanism is engaged almost simultaneously with the rear-extending spring of the front frame, so as to clamp the clasp into the cord ends and cut the cord by the shears. The sheaf is then dropped and taken up by the gatherer. The expense for binding-cord and clasps is but trifling, while the saving in hands in harvest time is very considerable, as it requires only two hands, one for working the reaper, and one for the binder. The whole crop may be gathered even by one person by using the reaper on the first day. Different sizes of ropes may be used by adjusting the jaws nearer to or wider apart, while the shears may be bound more or less tight by regulating the tension device accordingly.

Having thus described our invention, we claim as new and desire to secure by Letters Patent—

1. The combination, in a grain-binder, of supporting-frame A', rotating tine-sections D $e f$, thrown in and out of gear by lever mechanism E, lock mechanism F, for clamping and cutting binding-cord, and cord feeding, guiding, and tightening devices, all arranged as specified.

2. The supporting-arms $e$ of tine ends $f$, having slotted bars $g$ and set-screws $g^1$, in combination with spider-frames D, for being adjusted higher or lower, as required, in the manner described.

3. The center tines $f$, having band-springs $i$, for supporting binding-cord until carried through by the stretching mechanism, as set forth.

4. The lock mechanism F, composed of grooved spring-jaws $h$, cutting-shears $h^1$, and operating-lever $h^2$, as specified.

5. The lock F, having band-spring $h^3$ at rear side for fastening end of binding-cord and retaining clamp-plate in jaws, as described.

6. The combination of the rotating tine-sections and lock F with the adjustable cord-guiding bar $m$ and spool $l$ for feeding cord to binder, as set forth.

7. The spider-frames D, having adjustable toothed segments D', in combination with intermediate wheels and spool $l$ for winding up the cord in opposite direction, and stretching the same for binding the sheaf, substantially as set forth and described.

8. The combination of intermediate shaft $o^1$, having loose plate $p^2$, and regulating tension-springs $p$ with loose intermeshing wheel $o^2$ of shaft $o^1$ for interrupting, rewinding, and tightening of cord when the requisite degree of tension is obtained, as specified.

9. The combination of lever $h^2$ of lock mechanism F with rear-extending spring $n$ of frame A', for operating the clamping and cutting mechanism, as set forth.

WILLIAM LENZ.
ROBERT WITTKE.

Witnesses:
  N. F. DONALDSON,
  H. TOWSLEE.